(12) United States Patent
Feng et al.

(10) Patent No.: US 10,917,230 B2
(45) Date of Patent: Feb. 9, 2021

(54) MANAGING SENSITIVE DATA ELEMENTS IN A BLOCKCHAIN NETWORK

(71) Applicant: Advanced New Technologies Co., Ltd., Grand Cayman (KY)

(72) Inventors: Zhiyuan Feng, Hangzhou (CN); Yanpeng Li, Hangzhou (CN); Long Cheng, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/587,641

(22) Filed: Sep. 30, 2019

(65) Prior Publication Data

US 2020/0313858 A1   Oct. 1, 2020

Related U.S. Application Data

(63) Continuation of application No. PCT/CN2019/080493, filed on Mar. 29, 2019.

(51) Int. Cl.
*G06F 7/04* (2006.01)
*H04L 9/06* (2006.01)
*H04L 9/32* (2006.01)

(52) U.S. Cl.
CPC .......... *H04L 9/0637* (2013.01); *H04L 9/0643* (2013.01); *H04L 9/3247* (2013.01); *H04L 2209/38* (2013.01)

(58) Field of Classification Search
CPC ... H04L 9/0637; H04L 9/0643; H04L 9/3247; H04L 9/0825; H04L 2209/38
(Continued)

(56) References Cited

U.S. PATENT DOCUMENTS

| 10,158,480 B1 * | 12/2018 | Winklevoss | .......... H04L 9/3239 |
| 10,373,158 B1 * | 8/2019 | James | .................. G06Q 20/065 |

(Continued)

FOREIGN PATENT DOCUMENTS

| CN | 108256858 | 7/2018 |
| CN | 109214197 | 1/2019 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Samson B Lemma
(74) *Attorney, Agent, or Firm* — Fish & Richardson P.C.

(57) ABSTRACT

Disclosed herein are methods, systems, and apparatus, including computer programs encoded on computer storage media, for managing sensitive data elements stored in a blockchain network. One of the methods includes receiving a request from a client device to perform a modification to a watch list that is stored in the blockchain network. The watch list includes one or more sensitive data elements. The blockchain network node determines whether the client device is authorized to modify the watch list based on a digital signature in the request. In response to determining that the client device is authorized to modify the watch list, a consensus procedure is performed on the request within the blockchain network. After a consensus is achieved, the blockchain network node updates the watch list based on the modification to the watch list.

21 Claims, 6 Drawing Sheets

(58) Field of Classification Search
USPC .......................................................... 726/4
See application file for complete search history.

(56) References Cited

U.S. PATENT DOCUMENTS

| | | | |
|---|---|---|---|
| 2017/0039667 | A1 | 2/2017 | Kim |
| 2017/0149819 | A1 | 5/2017 | Androulaki et al. |
| 2017/0213221 | A1 | 7/2017 | Kurian et al. |
| 2017/0222814 | A1 | 8/2017 | Oberhauser et al. |
| 2017/0353311 | A1 | 12/2017 | Schukai et al. |
| 2018/0285869 | A1* | 10/2018 | Li .................... H04L 9/3247 |
| 2018/0323975 | A1 | 11/2018 | Curbera et al. |
| 2019/0036682 | A1 | 1/2019 | Qiu |
| 2019/0065764 | A1 | 2/2019 | Wood et al. |
| 2019/0294822 | A1* | 9/2019 | Hennebert .......... G06F 21/6254 |
| 2019/0295202 | A1* | 9/2019 | Mankovskii ............ H04L 63/10 |
| 2019/0304038 | A1* | 10/2019 | Purushothaman .... H04L 9/3239 |
| 2019/0312863 | A1* | 10/2019 | Chow .................. H04L 9/0643 |
| 2019/0386834 | A1* | 12/2019 | Furukawa ............... G06F 21/64 |

FOREIGN PATENT DOCUMENTS

| | | | |
|---|---|---|---|
| CN | 109257336 | | 1/2019 |
| CN | 109257336 A | * | 1/2019 |
| CN | 109302405 | | 2/2019 |
| CN | 109326337 | | 2/2019 |
| CN | 109347941 | | 2/2019 |
| KR | 101590076 | | 2/2016 |
| TW | 201812630 | | 4/2018 |
| WO | WO 2018158936 | | 9/2018 |

OTHER PUBLICATIONS

Nakamoto, "Bitcoin: A Peer-to-Peer Electronic Cash System," www.bitcoin.org, 2005, 9 pages.

Extended European search report in European application No. 19732213.4, dated Apr. 16, 2020, 7 pages.

International Search Report and Written Opinion in International Application No. PCT/CN2019/080493, dated Jan. 2, 2020, 7 pages.

* cited by examiner

MANAGING SENSITIVE DATA ELEMENTS IN A BLOCKCHAIN NETWORK

CROSS-REFERENCE TO RELATED APPLICATIONS

This application is a continuation of PCT Application No. PCT/CN2019/080493, filed on Mar. 29, 2019, which is hereby incorporated by reference in its entirety.

TECHNICAL FIELD

This specification relates to managing sensitive data elements stored in blockchain networks.

BACKGROUND

Distributed ledger systems (DLSs), which can also be referred to as consensus networks and/or blockchain networks, enable participating entities to securely and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

Data transmitted in a computer network, including blockchain networks, can include sensitive data such as personal information (e.g., biometric data, medical information, and Social Security numbers) that can be traced back to an individual, and that, if disclosed, could result in harm or loss to that person. The sensitive data can also include sensitive business information (e.g., trade secrets, acquisition plans, and financial data) that poses a risk to a business entity if discovered by a competitor or the general public. The sensitive data can include classified information which pertains to a government body and is restricted according to level of sensitivity (for example, restricted, confidential, secret, and top secret) to protect information security.

It would be desirable to provide a solution to addressing the data security issues of the sensitive data in computer networks.

SUMMARY

This specification describes technologies for managing sensitive data elements stored in blockchain networks. These technologies generally involve implementing a watch list in a blockchain network (also referred to as a blockchain-based watch list). The watch list includes one or more sensitive data elements that are subject to monitoring and/or filtering by one or more authorized entities (e.g., an organization, a regulator, an agency, or government). The sensitive data elements can contain or be related to sensitive, private, and/or confidential information. In some embodiments, the blockchain-based watch list stores the sensitive data elements in the blockchain network in a distributed manner. In some embodiments, the blockchain-based watch list can facilitate managing the sensitive data elements stored in the watch list. In some embodiments, the blockchain-based watch list can provide enhanced data security by providing tamper-resistant protection of the sensitive data elements and preventing malicious actions and cyber-attacks against the watch list.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

This specification describes technologies for managing sensitive data elements stored in blockchain networks. These technologies generally involve implementing a watch list in a blockchain network (also referred to as a blockchain-based watch list). The watch list includes one or more sensitive data elements that are subject to monitoring and/or filtering by one or more authorized entities (e.g., an organization, a regulator, an agency, or government). The sensitive data elements can contain or be related to sensitive, private, and/or confidential information. In some embodiments, the blockchain-based watch list stores the sensitive data elements in the blockchain network in a distributed manner. In some embodiments, the blockchain-based watch list can facilitate managing the sensitive data elements stored in the watch list. In some embodiments, the blockchain-based watch list can provide enhanced data security by providing tamper-resistant protection of the sensitive data elements and preventing malicious actions and cyber-attacks against the watch list.

The techniques described in this specification produce one or more technical effects. In some embodiments, a watch list can be implemented in a blockchain network. The watch list can include one or more sensitive data elements that are subject to monitoring and/or filtering by one or more authorized entities. The sensitive data elements in the watch list are stored in the blockchain network in a distributed manner. Due to the tamper-resistant nature of the distributed blockchain network, malicious actions and cyber-attacks against the watch list can be mitigated. In some embodiments, the blockchain-based watch list can facilitate managing the sensitive data elements stored in the watch list. For example, when a client device submits a request to perform a modification to a watch list stored in a blockchain network, a network node of the blockchain network that receives the request can authenticate the client device based on a digital signature of the client device in the request. In some embodiments, an authenticated client device can be allowed to perform the modification, while a client device that fails the authentication will be rejected from performing the modification. This can prevent the sensitive data stored in the blockchain network from being compromised by malicious actors, thereby improving the data security of the watch list. In some embodiments, the sensitive data elements in the watch list are encrypted, for example, using an encryption algorithm. In some embodiments, only authorized parties can decrypt the encrypted data elements and obtain the sensitive data elements. This can prevent a malicious actor from infiltrating the blockchain network and obtaining the sensitive data element, thereby improving data security of the watch list.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree are hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying, and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state of consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

Figure 1:
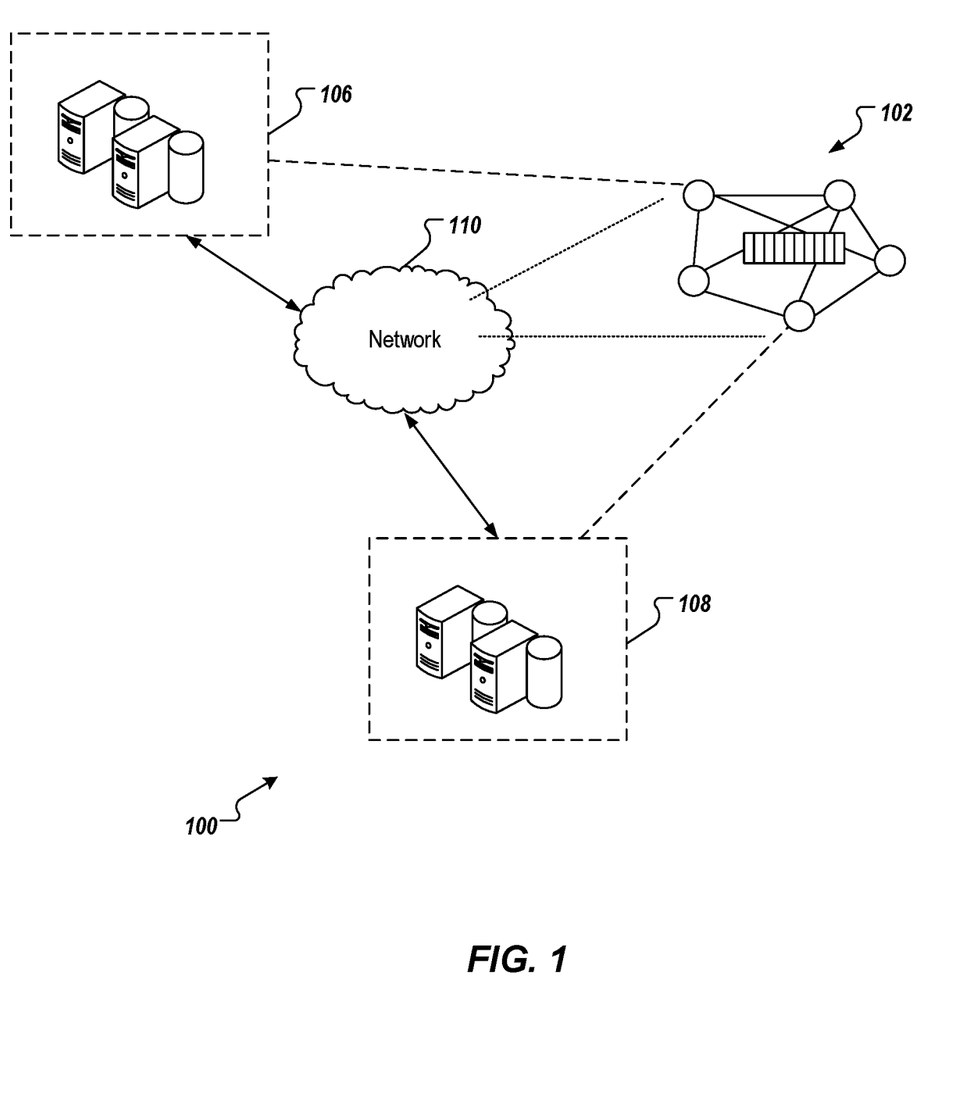
FIG. 1 is a diagram illustrating an example of an environment that can be used to execute embodiments of this specification.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing systems 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
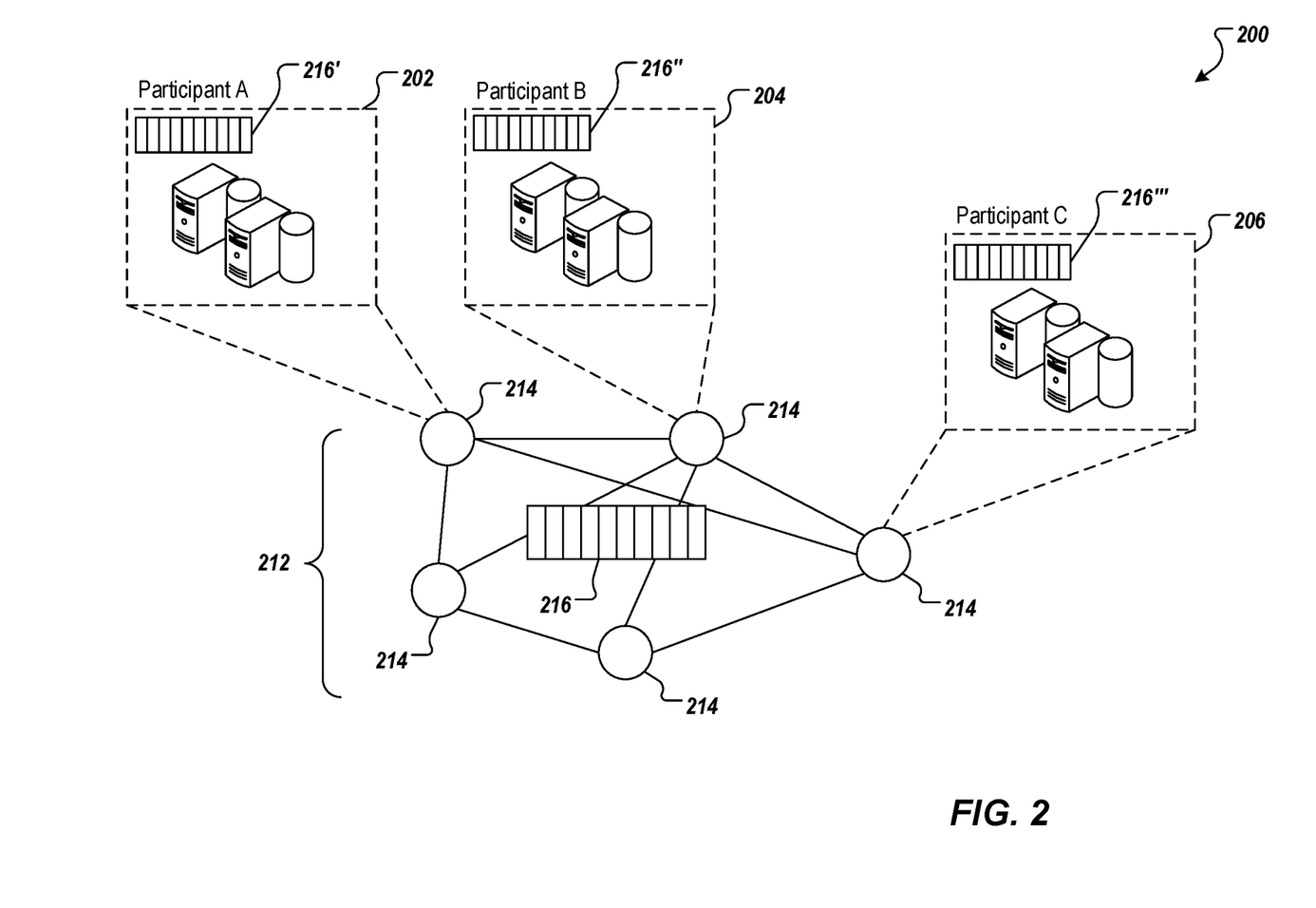
FIG. 2 is a diagram illustrating an example of an architecture in accordance with embodiments of this specification.

FIG. 2 depicts an example of an architecture 200 in accordance with embodiments of this specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including multiple nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as minder nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204 store respective, complete copies 216', 216" of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Furthermore, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

Figure 3:
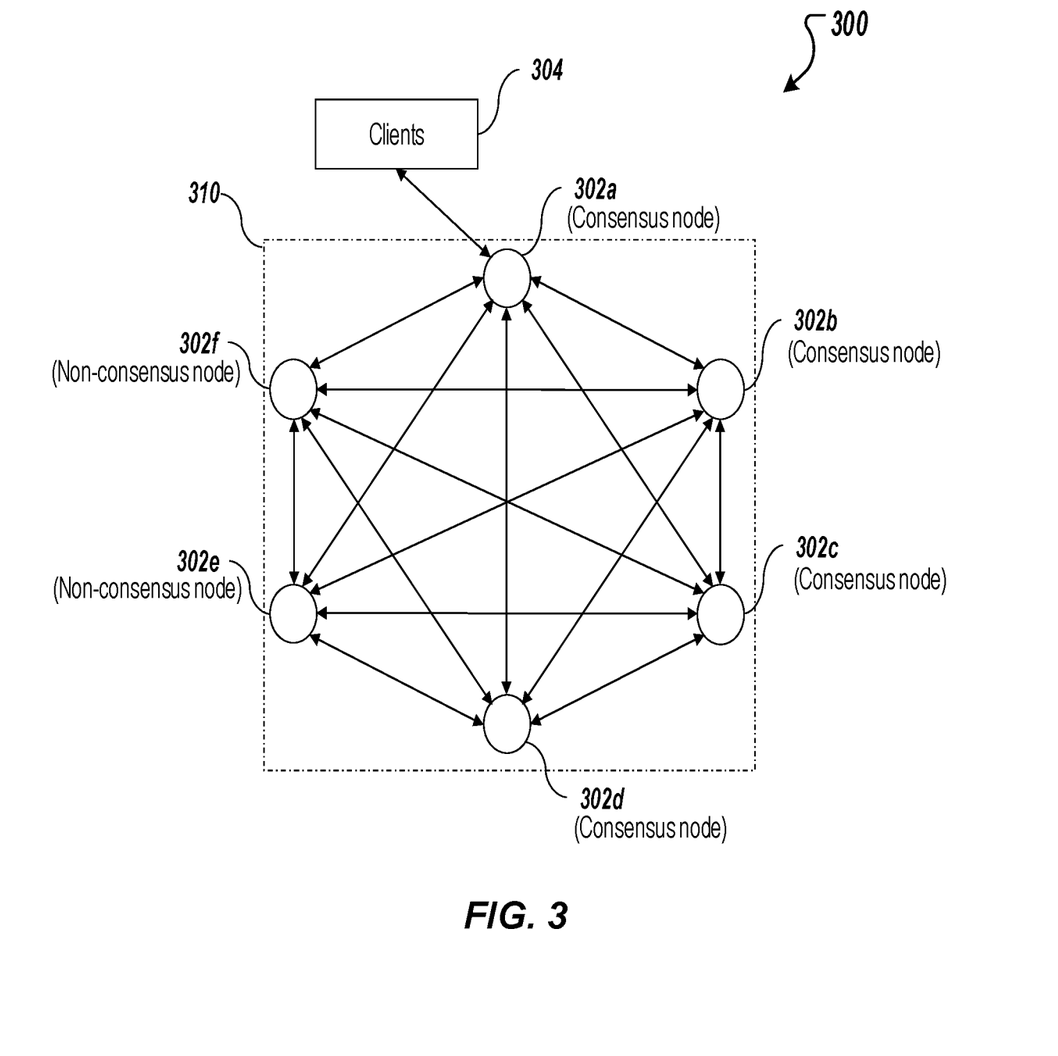
FIG. 3 is a diagram illustrating an example of a system in accordance with embodiments of this specification.

FIG. 3 is a diagram illustrating an example of a system 300 that manages sensitive data elements stored in a blockchain network. As shown, system 300 includes a blockchain network 310 including a number of blockchain network nodes 302a-f, and one or more client devices 304. Note that the blockchain network 310 is shown to include six blockchain network nodes 302 for illustrative purpose only. The blockchain network 310 can include any suitable number of blockchain network nodes 302. The client devices 304 can be any suitable computer, module, server, or computing element programmed to perform the methods described herein.

In some embodiments, the blockchain network 310 is configured to store a watch list including sensitive data elements that are subject to monitoring and/or filtering by an authorized entity (e.g., an organization, a regulator, an agency, or government). In some embodiments, the sensitive data elements can be monitored or filtered for privacy protection, data security, and/or censorship or surveillance purposes. In some examples, the sensitive data can include personal information such as personally identifiable information (e.g., biometric data, medical information, and social security numbers) that can be traced back to an individual, and that, if disclosed, could result in harm or loss to the individual. In some embodiments, the sensitive data can include sensitive business information (e.g., trade secrets, acquisition plans, and financial data) that poses a risk to a business entity if discovered by a competitor or the general public. In some embodiments, the sensitive data can include classified information which pertains to a government body and is restricted according to level of sensitivity (e.g., restricted, confidential, secret, and top secret) to protect information security. In some embodiments, the sensitive data can have a format of text, audio, video, or image, among others. In some embodiments, the sensitive data can include a malicious program that poses a potential security threat.

In some embodiments, a network node 302 (e.g., node 302a) of the blockchain network 310 receives a request from a client device 304. The request can include a request for a modification to the watch list (e.g., a request for adding a data element to the list, deleting a data element from the list, or editing a data element in the list). The network node 302a can initiate a consensus procedure within the blockchain network 310 such that the requested modification to the watch list can be performed if a subset of the blockchain network nodes 302 (e.g., consensus nodes 302a-d) can reach a consensus on the proposed modification.

In some embodiments, the blockchain network 310 includes a subset of the blockchain network nodes 302 (e.g., non-consensus nodes 302e-f) that do not participate in the consensus procedure. In some embodiments, the consensus nodes 302a-d of the blockchain network 310 can be allowed to process the request from the client device 304 to perform a modification to the watch list, while the non-consensus nodes 302e-f of the blockchain network 310 are not allowed to process the request from the client device 304 to perform a modification to the watch list. For example, a consensus node 302a-d can be implemented on a server of an authorized entity (e.g., government) that controls access to the watch list and updates the watch list periodically, while a non-consensus node 302e-f can be implemented on a server of a subsidiary of the authorized entity (e.g., a publishing platform) that can obtain the watch list from the consensus node 302a-d without permission or authority to modify the watch list.

Figure 4:
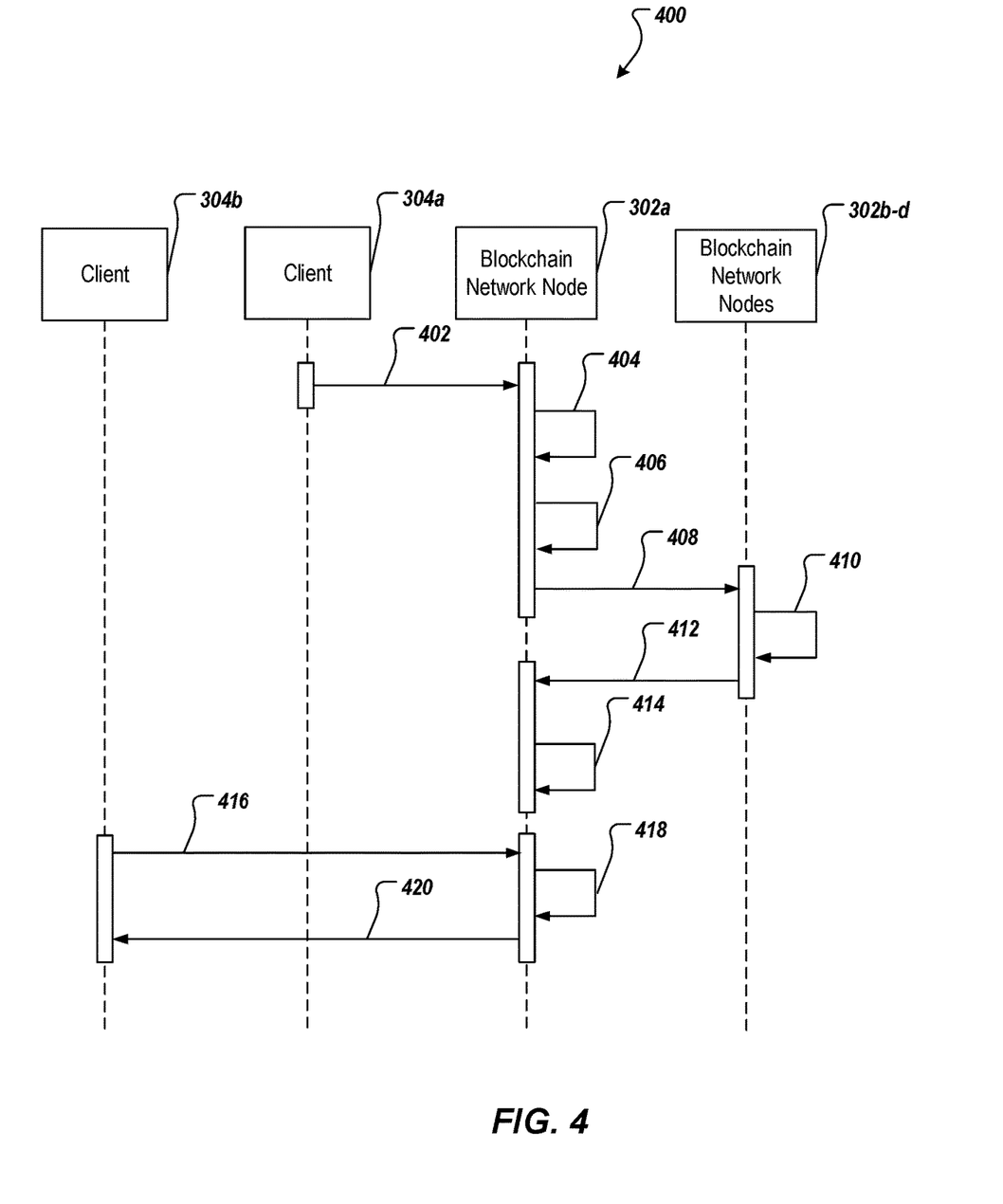
FIG. 4 depicts an example of a process that can be executed in accordance with embodiments of this specification.

FIG. 4 depicts an example of a signal flow 400 in accordance with embodiments of this specification. The signal flow 400 represents a process for managing sensitive data elements stored in a blockchain network. For convenience, the process will be described as being performed by a system of one or more computers, located in one or more locations, and programmed appropriately in accordance with this specification. For example, a distributed system (e.g., the system 300 of FIG. 3), appropriately programmed, can perform the process.

The process 400 starts at 402 where a client device (e.g., client 304a) sends a request to the blockchain network 310 to perform a modification to a watch list stored in the blockchain network. For example, the client 304a sends the request to consensus node 302a of the blockchain network 310. The watch list includes a number of sensitive data elements (e.g., keywords) are subject to monitoring, filtering, or both by one or more authorized entities. In some embodiments, the modification to the watch list include one or more of adding a data element to the list, deleting a data element from the list, or editing a data element in the list. In some embodiments, some or all of the sensitive data elements in the watch list can be encrypted so that they are not viewable or known to the general public.

In some embodiments, the request includes an identity information (e.g., an identifier) of the client device 304a and a digital signature generated using a private key of the client device 304a. The digital signature can be used to verify or authenticate the identity of the client device 304a.

At 404, the blockchain network node 302a determines whether the client device 304a is authorized to modify the watch list stored in the blockchain network 310. In some embodiments, the blockchain network node 302a stores a whitelist including identifiers of client devices that are authorized to modify the watch list.

In some embodiments, the blockchain network node 302a can determine whether the identifier of the client device 304a in the request matches an identifier of a client device in the whitelist. Additionally or alternatively, the blockchain network node 302a can determine whether the digital signature in the request can be decrypted using a public key of a client device in the whitelist (e.g., the public key of a client in the whitelist whose identifier matches the identifier of the client device 304a in the request). In some embodiments, the public keys of the client devices in the whitelist are stored in the blockchain network. The blockchain network node 302a can retrieve the public keys of the client devices in the whitelist from the blockchain network or obtain them from another resource.

If the digital signature in the request is decrypted using the public key of a client device in the whitelist, the blockchain network node 302a can extract a hash generated by the client device 304a in the request. The blockchain network node 302a can hash the received request and compare the generated hash with the hash extracted from the digital signature. If the hashes match, the blockchain network node 302a determines that the client device 304a is authorized to modify the watch list and the process proceeds to next step. If the hashes do not match or the digital signature in the request cannot be decrypted using a public key of any client device in the whitelist, the blockchain network node 302a determines that the client device 304a is not authorized to modify the watch list and can terminate the process. For example, the blockchain network node 302a can send an error message to client device 304a indicating that the client device 304a is not authorized to modify the watch list and the request is rejected.

At 406, the blockchain network node 302a initiates a consensus procedure within the blockchain network 310 on the proposed modification from the client device 304a. The blockchain network node 302a can identify the other consensus nodes 302b-d in the blockchain network 310. In some embodiments, the consensus procedure is performed among the consensus nodes 302a-d of the blockchain network 310. Examples of the consensus procedure as described herein include proof of work, proof of stake, or practical Byzantine fault tolerance, among others. For example, the consensus procedure can involve the following steps: the consensus node 302a multicasts an initial message for verifying the request to the other consensus nodes (e.g., nodes 302b-d); the consensus nodes 302b-d verify the request using a smart contract and then send a reply message to the node 302a; and the consensus node 302a awaits for a number of reply messages from different nodes with the same result. If the number of reply messages from the other nodes with the same result exceeds a predetermined threshold, the consensus node 302a can determine that a consensus has been achieved and perform the proposed modification in the request. For example, if the modification includes adding a new sensitive data element to the watch list, the consensus node 302a can store the new sensitive data element in the watch list.

At 408, the blockchain network node 302a sends a notification to the other network nodes of the blockchain network 310. In some embodiments, the notification includes the modification in the request from the client device 304a and a request instructing the other network nodes to execute a consensus procedure. In some embodiments, the blockchain network node 302a sends the notification to the consensus nodes 302b-d such that only the consensus nodes 302a-d are notified to participate the consensus procedure.

At 410, the blockchain network nodes 302b-d execute the consensus procedure. In some embodiments, each of the nodes 302b-d multicasts an initial message for verifying the request to the other consensus nodes, and awaits for a number of reply messages from different nodes with the same result. If the number of reply messages from the other nodes with the same result exceeds a predetermined threshold, the blockchain network node 302b-d can determine that a consensus has been achieved and perform the proposed modification in the request. For example, if the modification includes adding a new sensitive data element to the watch list, the blockchain network node 302b-d can store the new sensitive data element in the watch list such that each of the consensus nodes 302a-d can have an updated watch list that includes the new sensitive data element.

At 412, the blockchain network nodes 302b-d send a notification to the network node 302a indicating that the consensus procedure has been executed on each network node and the consensus has been achieved.

At 414, the blockchain network node 302a determines that the consensus procedure has been executed by the consensus nodes of the blockchain network 310 based on the notifications from the other consensus nodes. In some embodiments, the blockchain network node 302a generates a blockchain transaction based on the request from the client device 304a and computes a Merkle tree root hash value based on the blockchain transaction. The Merkle tree root hash value can be used by the consensus nodes 302a-d for identifying malicious network nodes in a future consensus procedure.

At 416, a client device (e.g., client device 304b) sends an inquiry request to blockchain network node 302a for a sensitive data element in the watch list stored in the blockchain network 310. In some embodiments, the inquiry request includes a digital signature generated using a private key of the client device 304b.

At 418, the blockchain network node 302a determines whether the client device 304b is authorized to obtain the sensitive data element in the watch list. In some embodiments, the blockchain network node 302a can determine whether the client device 304b is authorized to obtain the sensitive data element in the watch list, for example, based on the digital signature in the request and a public key of an authorized entity listed in a whitelist stored in blockchain network node 302a according to the techniques described with respect to 404 or in another manner. If the blockchain network node 302a determines that the client device 304b is not authorized to obtain the sensitive data element in the watch list, the blockchain network node 302a can reject the request.

At 420, the blockchain network node 302a sends the sensitive data element to the client device 304b in response to determining that the client device 304b is authorized to obtain the sensitive data element. In some embodiments, the sensitive data element is encrypted and the client device 304b can receive the encrypted sensitive data element. In some embodiments, the sensitive data element can be encrypted using a secret key. If the client device 304b holds the secret key, the client device 304b can obtain the sensitive data element by decrypting the encrypted sensitive data element.

Figure 5:
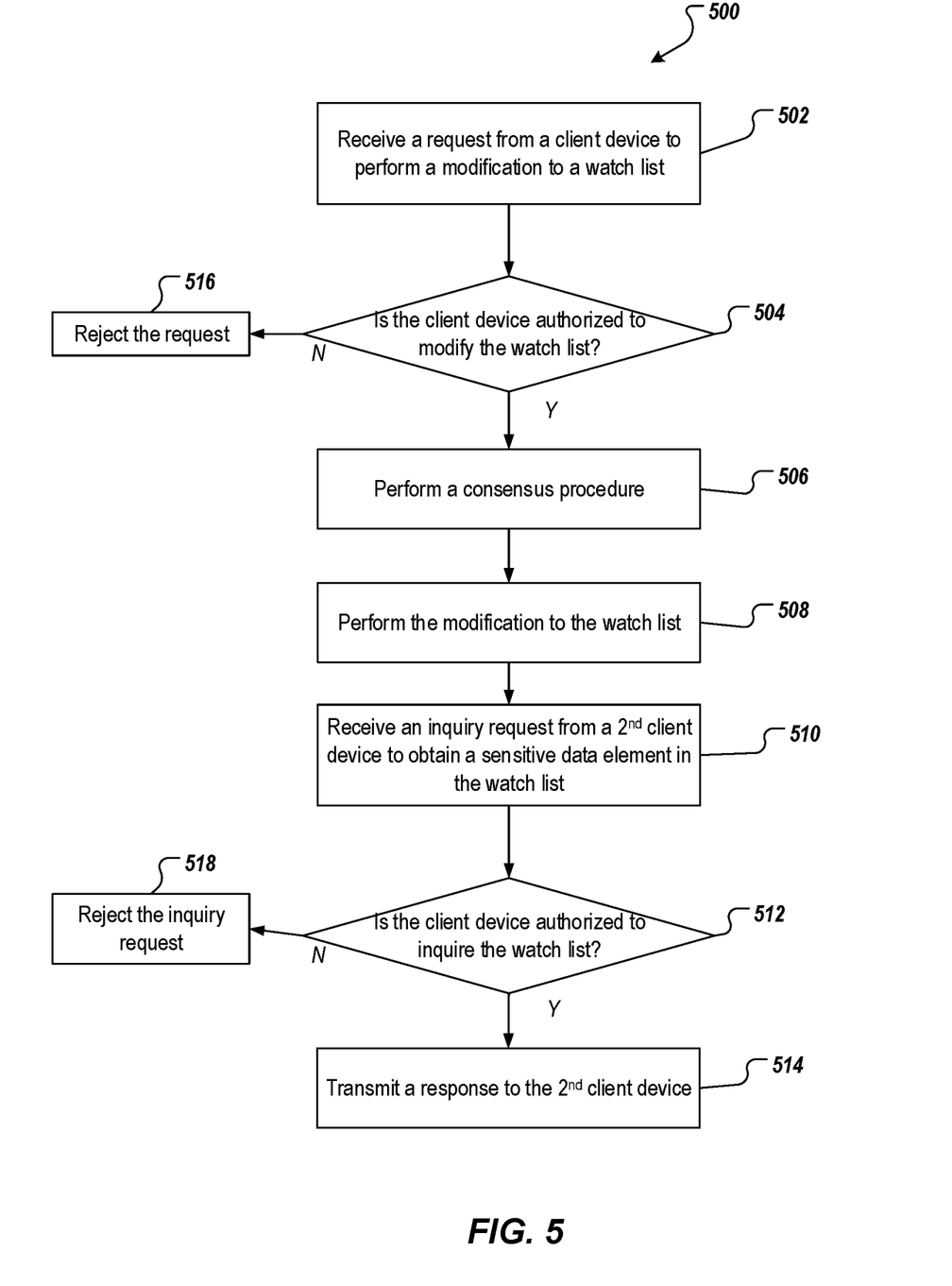
FIG. 5 depicts an example of a process that can be executed in accordance with embodiments of this specification.

FIG. 5 is a flowchart of an example of a process 500 for managing sensitive data elements stored in a blockchain network. For convenience, the process 500 will be described as being performed by a system of one or more computers, located in one or more locations, and programmed appropriately in accordance with this specification. For example, a distributed system, e.g., the distributed system 300 of FIG. 3, appropriately programmed, can perform the process 500.

At 502, a blockchain network node (e.g., the blockchain network node 302) receives a request from a client device (e.g., the client device 304) to perform a modification to a watch list that is stored in a blockchain network (e.g., the blockchain network 310). In some embodiments, the blockchain network node can be a consensus node of the blockchain network. In some embodiments, the watch list includes a number of sensitive data elements (e.g., in the form of keywords) that are subject to monitoring and/or filtering, for example, by a network node (e.g., the blockchain network or another network such as the Internet). In some embodiments, the request includes a digital signature generated using a private key of the client device. In some embodiments, the modification in the request includes one or more of a request for adding a data element to the list, a request for deleting a data element from the list, or a request for editing a data element in the list. In some embodiments, the sensitive data element in the watch list can be encrypted.

At 504, the blockchain network node determines whether the client device is authorized to modify the watch list. In some embodiments, the blockchain network node determines whether the client device is authorized to modify the watch list based on the digital signature in the request from the client device. In some embodiments, the blockchain network node stores a whitelist including identifiers and/or public keys of one or more client devices that are authorized to modify the watch list. In some embodiments, determining, by the network node, whether the client device is authorized to modify the watch list based on the digital signature includes determining that the client device is authorized to modify the watch list based on the digital signature in the request and a public key of an authorized entity that is authorized to modify the watch list, for example, according to the techniques described with respect to 404 or in another manner.

If the client device is determined to be authorized to modify the watch list, the process proceeds to step 506. If the client device is determined to not be authorized to modify the watch list, the process proceeds to step 516 wherein the request is rejected.

At 506, the blockchain network node performs a consensus procedure on the request within the blockchain network after determining that the client device is determined to be authorized to modify the watch list. Examples of the consensus procedure as described herein include proof of work, proof of stake, or practical Byzantine fault tolerance, among others. In some embodiments, the blockchain network node can identify the other consensus nodes in the blockchain network. In some embodiments, the consensus procedure is performed among the consensus nodes of the blockchain network. For example, the consensus procedure can involve the following steps: the blockchain network node multicasts an initial message for verifying the request to the other consensus nodes; the other consensus nodes verify the request using a smart contract and then send a reply message to the blockchain network node; and the blockchain network node awaits for a number of reply messages from different nodes with the same result. If the number of reply messages from the other consensus nodes with the same result exceeds a predetermined threshold, the blockchain network node can determine that a consensus has been achieved.

At 508, the blockchain network node performs the modification in the request after determine that completing the consensus procedure and determining that a consensus has been achieved. In some examples, if the modification includes adding a new sensitive data element to the watch list, the blockchain network node can store the new sensitive data element in the watch list. In some embodiments, the blockchain network node can encrypt the new sensitive data element before storing the new sensitive data element in the watch list.

At 510, the blockchain network node receives, for example, from a second client device, an inquiry request for a sensitive data element in the watch list that is stored in the blockchain network. In some embodiments, the inquiry request includes a second digital signature generated using a private key of the second client device.

At 512, the blockchain network node determines whether the second client device is authorized to review, access, or otherwise obtain the sensitive data element based on the second digital signature. In some embodiments, the blockchain network node stores a whitelist including identifiers and/or public keys of one or more client devices that are authorized to review, access, or otherwise obtain a sensitive data element in the watch list (collectively referred to as inquire the watch list). In some embodiments, the whitelist can be the same as or different from the whitelist that includes identifiers and/or public keys of one or more client devices that are authorized to modify the watch list. In some embodiments, client devices can be assigned additional or different levels of authorities with respect to allowed operations of the watch list, and can be indicated in single or multiple whitelists.

In some embodiments, determining, by the network node, whether the client device is authorized to inquire the watch list based on the digital signature includes determining that the client device is authorized to inquire the watch list based on the digital signature and a public key of an authorized entity that is authorized to inquire the watch list, for example, according to the techniques described with respect to 404 or in another manner.

If the client device is determined to be authorized to inquire the watch list, the process proceeds to step 514. If the client device is determined to be not authorized to inquire the watch list, the process proceeds to step 518 wherein the inquiry request is rejected.

At 514, in response to determining that the second client device is authorized to obtain the sensitive data element, the blockchain network node transmits a response to the second client device. The response includes the requested sensitive data element. In some embodiments, the sensitive data element in the watch list is encrypted, and the response include the encrypted sensitive data element.

Figure 6:
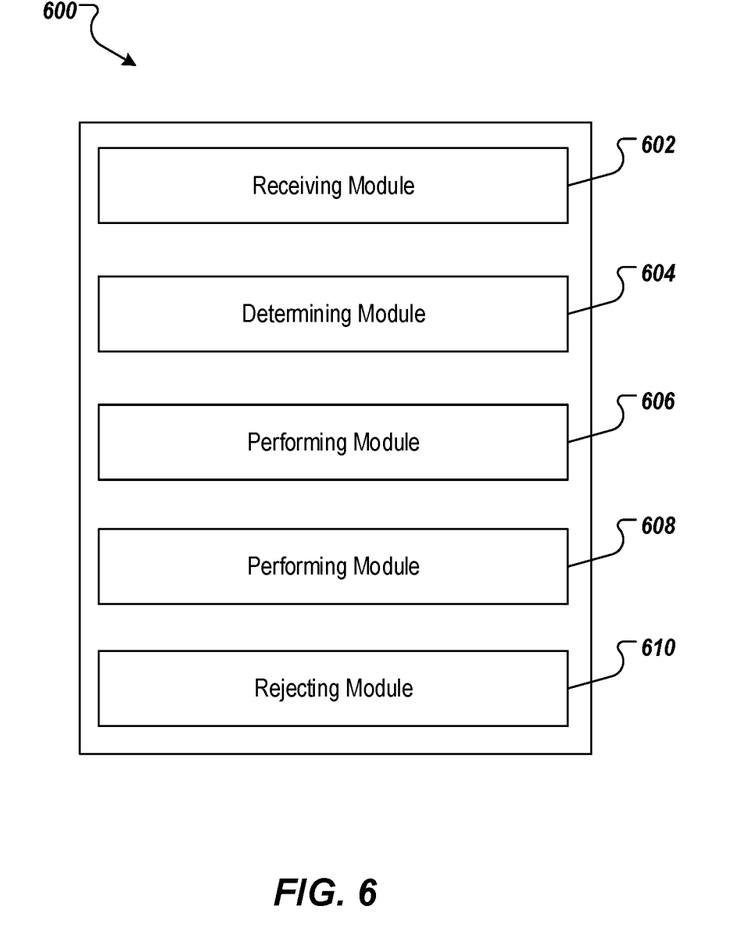
FIG. 6 depicts examples of modules of an apparatus in accordance with embodiments of this specification.

FIG. 6 is a diagram of an example of modules of an apparatus 600 in accordance with embodiments of this specification. The apparatus 600 can be an example of an embodiment of a node of a blockchain network configured to manage sensitive data elements stored in a blockchain network. The apparatus 600 can correspond to the embodiments described above, and the apparatus 600 includes the following: a receiving module 602 that receives a request from a client device to perform a modification to a watch list that is stored in the blockchain network, the watch list including multiple sensitive data elements, and the request including a digital signature generated using a private key of the client device; a determining module 604 that determines whether the client device is authorized to modify the watch list based on the digital signature; a performing module 606 that performs a consensus procedure on the request within the blockchain network in response to determining that the client device is authorized to modify the watch list; a performing module 608 that performs the modification to the watch list in response to determining that a consensus is achieved after completing the consensus procedure; and a rejecting module 610 that rejects the request from the client device to perform the modification to the watch list.

In an optional embodiment, the multiple sensitive data elements are subject to monitoring, filtering, or both by one or more authorized entities.

In an optional embodiment, the request to perform the modification to the watch list includes one or more of a request to add a new sensitive data element to the watch list, a request to remove a sensitive data element from the watch list, or a request to edit a sensitive data element in the watch list.

In an optional embodiment, the multiple sensitive data elements are encrypted.

In an optional embodiment, the apparatus 600 further includes the following: a determining sub-module that determines the client device is authorized to modify the watch list based on the digital signature and a public key of an authorized entity that is authorized to modify the watch list.

In an optional embodiment, the authorized entity is indicated in a whitelist that is stored in the network node, and the whitelist includes one or more authorized entities that are authorized to modify the watch list.

In an optional embodiment, the apparatus 600 further includes the following: a receiving module that receives an inquiry request from a second client device for a sensitive data element in the watch list that is stored in the blockchain network, the inquiry request including a second digital signature generated using a private key of the second client device; a determining module that determines whether the second client device is authorized to obtain the sensitive data element based on the second digital signature; and a transmitting module that transmits a response to the second client device, the response including the sensitive data element that is encrypted.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 6, it can be interpreted as illustrating an internal functional module and a structure of a blockchain data element managing apparatus. The blockchain data element managing apparatus can be an example of a blockchain network node configured to manage sensitive data elements stored in a blockchain network. An execution body in essence can be an electronic device, and the electronic device includes the following: one or more processors, and a memory configured to store an executable instruction of the one or more processors.

The techniques described in this specification produce one or more technical effects. In some embodiments, when a client device submits a request to perform a modification to a watch list stored in a blockchain network, a network node of the blockchain network that receives the request need to authenticate the client device based on a digital signature of the client device in the request. In some embodiments, an authenticated client device can be allowed to perform the modification, while a client device that fails the authentication will be rejected from performing the modification. This can prevent the sensitive data stored in the blockchain network from being compromised by malicious actors, thereby improving the data security of the blockchain network. Furthermore, in some embodiments, the sensitive data elements in the watch list are encrypted (e.g., encrypting using a secret key). Only a client device that holds the secret key can decrypt the encrypted data elements and obtain the sensitive data element. This prevents a malicious actor from infiltrating the blockchain network and obtaining the sensitive data element, thereby improving data security of the blockchain network. Moreover, the sensitive data elements in the watch list are stored in the blockchain network in a distributed manner. Due to the tamper-resistant nature of the distributed blockchain network, malicious actions and cyber-attacks against the watch list can be mitigated.

Described embodiments of the subject matter can include one or more features, alone or in combination. For example, in a first embodiment, a method for managing sensitive data elements stored in a blockchain network includes receiving, by a network node of a blockchain network, a request from a client device to perform a modification to a watch list that is stored in the blockchain network, the watch list including multiple sensitive data elements, and the request including a digital signature generated using a private key of the client device; determining, by the network node, whether the client device is authorized to modify the watch list based on the digital signature; in response to determining that the client device is authorized to modify the watch list, performing, by the network node, a consensus procedure on the request within the blockchain network, and in response to determining that a consensus is achieved after completing the consensus procedure, performing, by the network node, the modification to the watch list; and in response to determining that the client device is not authorized to modify the watch list, rejecting, by the network node, the request from the client device to perform the modification to the watch list. The foregoing and other described embodiments can each, optionally, include one or more of the following features:

A first feature, combinable with any of the following features, specifies that the multiple sensitive data elements are subject to monitoring, filtering, or both by one or more authorized entities.

A second feature, combinable with any of the previous or following features, specifies that the request to perform the modification to the watch list includes one or more of a request to add a new sensitive data element to the watch list, a request to remove a sensitive data element from the watch list, or a request to edit a sensitive data element in the watch list.

A third feature, combinable with any of the previous or following features, specifies that the multiple sensitive data elements are encrypted.

A fourth feature, combinable with any of the previous or following features, specifies that the determining, by the network node, whether the client device is authorized to modify the watch list based on the digital signature includes the following: determining that the client device is authorized to modify the watch list based on the digital signature and a public key of an authorized entity that is authorized to modify the watch list.

A fifth feature, combinable with any of the previous or following features, specifies that the authorized entity is indicated in a whitelist that is stored in the network node, and the whitelist includes one or more authorized entities that are authorized to modify the watch list.

A sixth feature, combinable with any of the previous or following features, specifies that the method further includes: receiving, by the network node, an inquiry request from a second client device for a sensitive data element in the watch list that is stored in the blockchain network, wherein the inquiry request includes a second digital signature generated using a private key of the second client device; determining, by the network node, whether the second client device is authorized to obtain the sensitive data element based on the second digital signature; and in response to determining that the second client device is authorized to obtain the sensitive data element, transmitting, by the network node, a response to the second client device, the response including the sensitive data element that is encrypted.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for managing sensitive data elements that are stored in a blockchain network, the method comprising:
   receiving, by a consensus node of the blockchain network, a request from a client device to perform a modification to a watch list that is stored in the blockchain network, wherein the watch list comprises a plurality of sensitive data elements, and wherein the request comprises a digital signature generated using a private key of the client device;
   determining, by the consensus node, that the client device is authorized to modify the watch list based on the digital signature;
   performing, by the consensus node, a consensus procedure on the request within the blockchain network, wherein the consensus procedure comprises:
      transmitting, to a plurality of other consensus nodes of the blockchain network, a request verification message, wherein each consensus node is on a server of a first entity, the first entity and the consensus nodes having authorization to modify the watch list, and
      receiving reply messages from the plurality of other consensus nodes;
   determining, based on the reply messages, that a consensus is achieved;
   performing, by the consensus node, the modification to the watch list; and
   sending, by the consensus node, to a non-consensus node of the blockchain network, the modified watch list, wherein the non-consensus node is on a server of a second entity, the second entity and the non-consensus node having authorization to obtain the modified watch list and not having authorization to modify the modified watch list.

2. The method of claim 1, wherein the plurality of sensitive data elements are subject to monitoring, filtering, or both by the first entity.

3. The method of claim 1, wherein the request to perform the modification to the watch list comprises one or more of a request to add a new sensitive data element to the watch list, a request to remove a sensitive data element from the watch list, or a request to edit a sensitive data element in the watch list.

4. The method of claim 1, wherein the plurality of sensitive data elements are encrypted.

5. The method of claim 1, wherein the determining, by the consensus node, that the client device is authorized to modify the watch list based on the digital signature comprises determining that the client device is authorized to modify the watch list based on the digital signature and a public key of a third authorized entity that is authorized to modify the watch list.

6. The method of claim 5, wherein the third authorized entity is indicated in a whitelist that is stored in the consensus node, and wherein the whitelist comprises one or more authorized entities that are authorized to modify the watch list.

7. The method of claim 1, further comprising:
receiving, by the consensus node, an inquiry request from a second client device for a sensitive data element in the watch list that is stored in the blockchain network, wherein the inquiry request comprises a second digital signature generated using a private key of the second client device;
determining, by the consensus node, that the second client device is authorized to obtain the sensitive data element based on the second digital signature; and
in response to determining that the second client device is authorized to obtain the sensitive data element, transmitting, by the consensus node, a response to the second client device, the response comprising the sensitive data element that is encrypted.

8. A non-transitory, computer-readable storage medium storing one or more instructions that, when executed by a computer system, cause the computer system to perform operations comprising:
receiving, by a consensus node of a blockchain network, a request from a client device to perform a modification to a watch list that is stored in the blockchain network, wherein the watch list comprises a plurality of sensitive data elements, and wherein the request comprises a digital signature generated using a private key of the client device;
determining, by the consensus node, that the client device is authorized to modify the watch list based on the digital signature;
performing, by the consensus node, a consensus procedure on the request within the blockchain network, wherein the consensus procedure comprises:
transmitting, to a plurality of other consensus nodes of the blockchain network, a request verification message, wherein each consensus node is on a server of a first entity, the first entity and the consensus nodes having authorization to modify the watch list, and
receiving reply messages from the plurality of other consensus nodes;
determining, based on the reply messages, that a consensus is achieved;
performing, by the consensus node, the modification to the watch list; and
sending, by the consensus node, to a non-consensus node of the blockchain network, the modified watch list, wherein the non-consensus node is on a server of a second entity, the second entity and the non-consensus node having authorization to obtain the modified watch list and not having authorization to modify the modified watch list.

9. The non-transitory, computer-readable storage medium of claim 8, wherein the plurality of sensitive data elements are subject to monitoring, filtering, or both by the first entity.

10. The non-transitory, computer-readable storage medium of claim 8, wherein the request to perform the modification to the watch list comprises one or more of a request to add a new sensitive data element to the watch list, a request to remove a sensitive data element from the watch list, or a request to edit a sensitive data element in the watch list.

11. The non-transitory, computer-readable storage medium of claim 8, wherein the plurality of sensitive data elements are encrypted.

12. The non-transitory, computer-readable storage medium of claim 8, wherein the determining, by the consensus node, that the client device is authorized to modify the watch list based on the digital signature comprises determining that the client device is authorized to modify the watch list based on the digital signature and a public key of a third authorized entity that is authorized to modify the watch list.

13. The non-transitory, computer-readable storage medium of claim 12, wherein the third authorized entity is indicated in a whitelist that is stored in the consensus node, and wherein the whitelist comprises one or more authorized entities that are authorized to modify the watch list.

14. The non-transitory, computer-readable storage medium of claim 8, wherein the operations further comprise:
receiving, by the consensus node, an inquiry request from a second client device for a sensitive data element in the watch list that is stored in the blockchain network, wherein the inquiry request comprises a second digital signature generated using a private key of the second client device;
determining, by the consensus node, that the second client device is authorized to obtain the sensitive data element based on the second digital signature; and
in response to determining that the second client device is authorized to obtain the sensitive data element, transmitting, by the consensus node, a response to the second client device, the response comprising the sensitive data element that is encrypted.

15. A computer-implemented system, comprising:
one or more computers; and
one or more computer memory devices interoperably coupled with the one or more computers and having tangible, non-transitory, machine-readable media storing one or more instructions that, when executed by the one or more computers, cause the one or more computers to perform one or more operations comprising:
receiving, by a consensus node of a blockchain network, a request from a client device to perform a modification to a watch list that is stored in the blockchain network, wherein the watch list comprises a plurality of sensitive data elements, and wherein the request comprises a digital signature generated using a private key of the client device;
determining, by the consensus node, that the client device is authorized to modify the watch list based on the digital signature;
performing, by the consensus node, a consensus procedure on the request within the blockchain network, wherein the consensus procedure comprises:

transmitting, to a plurality of other consensus nodes of the blockchain network, a request verification message, wherein each consensus node is on a server of a first entity, the first entity and the consensus nodes having authorization to modify the watch list, and receiving reply messages from the plurality of other consensus nodes;

determining, based on the reply messages, that a consensus is achieved;

performing, by the consensus node, the modification to the watch list; and sending, by the consensus node, to a non-consensus node of the blockchain network, the modified watch list, wherein the non-consensus node is on a server of a second entity, the second entity and the non-consensus node having authorization to obtain the modified watch list and not having authorization to modify the modified watch list.

16. The computer-implemented system of claim 15, wherein the plurality of sensitive data elements are subject to monitoring, filtering, or both by the first entity.

17. The computer-implemented system of claim 15, wherein the request to perform the modification to the watch list comprises one or more of a request to add a new sensitive data element to the watch list, a request to remove a sensitive data element from the watch list, or a request to edit a sensitive data element in the watch list.

18. The computer-implemented system of claim 15, wherein the plurality of sensitive data elements are encrypted.

19. The computer-implemented system of claim 15, wherein the determining, by the consensus node, that the client device is authorized to modify the watch list based on the digital signature comprises determining that the client device is authorized to modify the watch list based on the digital signature and a public key of a third authorized entity that is authorized to modify the watch list.

20. The computer-implemented system of claim 19, wherein the third authorized entity is indicated in a whitelist that is stored in the consensus node, and wherein the whitelist comprises one or more authorized entities that are authorized to modify the watch list.

21. The computer-implemented system of claim 15, wherein the operations further comprise:

receiving, by the consensus node, an inquiry request from a second client device for a sensitive data element in the watch list that is stored in the blockchain network, wherein the inquiry request comprises a second digital signature generated using a private key of the second client device;

determining, by the consensus node, that the second client device is authorized to obtain the sensitive data element based on the second digital signature; and in response to determining that the second client device is authorized to obtain the sensitive data element, transmitting, by the consensus node, a response to the second client device, the response comprising the sensitive data element that is encrypted.

* * * * *